2,874,163
Patented Feb. 17, 1959

2,874,163

DIPHENYLALKYLAMINOMETHYL PYRROLIDINES

John H. Biel, Milwaukee, Wis., assignor to Lakeside Laboratories, Inc., Milwaukee, Wis., a corporation of Wisconsin No Drawing. Application December 10, 1957
Serial No. 701,737

7 Claims. (Cl. 260—313)

This invention relates to novel chemical compounds. More particularly, this invention is concerned with certain novel derivatives of pyrrolidine.

This application is a continuation-in-part of my copending application Serial No. 543,583, filed October 28, 1955, now abandoned.

According to the present invention there are provided novel compounds of the formula

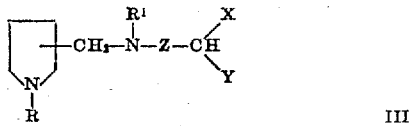

wherein R is a lower alkyl group, $R^1$ is hydrogen or a lower alkyl group, X and Y are monocarbocyclic groups, advisably monocyclic aryl groups such as phenyl groups and phenyl groups having nuclear substituents such as halogen, lower alkyl, lower alkoxy, or nitro groups, and Z is a bond or a straight or branched alkylene group, preferably from 1 through 10 carbons, and acid addition and quaternary ammonium salts thereof.

These compounds may be produced by reacting an alkyl-3-halopiperidine (I) with an appropriate diphenyl primary or secondary amine or alkylamine (II) as follows:

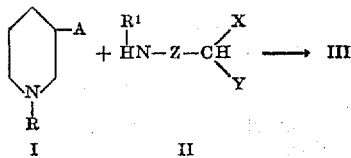

wherein R, $R^1$, X, Y and Z have the significance previously assigned and A is a halogen, advisably bromine or chlorine. Surprisingly, the piperidine ring undergoes a ring contraction in the reaction and yields a 2-pyrrolidyl-methyl group.

Any halopiperidines may be employed in which the halogen is in the 3rd nuclear position. Examples of compounds which may be used are N-ethyl-3-chloropiperidine, N-methyl-3-bromopiperidine, and the like. Benzhydrylamine as well as N-alkyl-benzhydrylamines may be used in this process and the phenyl groups of such compounds may also be nuclear substituted as previously indicated. In addition, related diphenylalkylamines such 2,2 - diphenylethylamine, N - methyl - 3,3 - diphenylpropylamine and 4-(p-chlorophenyl)-4-phenyl-butylamine may also be used.

The reaction is conveniently achieved by contacting the reactants in the presence of an inert organic solvent at elevated temperatures such as the reflux temperature. Solvents such as the lower alcohols, hexane and ether may be used. Sodamide may be added to maintain basic reaction conditions. At reflux temperature, reaction times of about 3 through 12 hours are generally adequate to complete the reaction. After the reaction is completed, the solvent may be removed under reduced pressure, leaving the product as a residual oil. It is purified by adding it to alkaline water and extraction with ether. After the ether is removed the product may be collected by fractional distillation.

Representative of the products which may be produced by this process using reactants such as indicated above are N-methyl-2-(benzhydrylaminomethyl)-pyrrolidine, N-methyl - 2 - (p - chlorobenzhydrylaminomethyl) - pyrrolidine, N - (N' - methyl - 2 - pyrrolidylmethyl) - N - methyl - benzhydrylamine, N - ethyl - 2 - (3,3 - diphenylpropylaminomethyl) - pyrrolidine, N - propyl - 2 - (4,4 - diphenylbutylaminomethyl) - pyrrolidine, N - methyl - 2 - (p - methylbenzhydrylaminomethyl) - pyrrolidine, N - ethyl - 2 - (p - ethoxybenzhydrylaminomethyl) - pyrrolidine, and N - propyl - 2 - (p - nitrobenzhydrylmethylaminomethyl) - pyrrolidine.

Acid addition salts of the pyrrolidines and N-alkyl pyrrolidines of this invention are produced by contacting them with a suitable acid such as a mineral acid like sulfuric acid, or hydrochloric acid or organic acids like formic acid, citric acid, fumaric acid and maleic acid. One or two equivalents of acid may be reacted per mole of compound to produce mono- or di-salts thereof.

Quaternary ammonium salts are also readily prepared by contacting the compounds with alkyl and aralkyl esters of mineral and organic acids, preferably in the presence of an organic solvent. Alkyl halides such as methyl chloride, and ethyl bromide and dimethyl sulfate are representative compounds that may be used to form quaternary ammonium salts. In addition, o-chlorobenzyl bromide, phenethyl chloride and propargyl bromide may be used to form salts.

The compounds of this invention have useful medicinal properties and are indicated to be psychotherapeutic agents. These compounds have a tranquilizing effect in animals; they thus have veterinary applications. They also form salts with acidic antibiotics and thus can be used to isolate and purify such antibiotics, particularly penicillin, from fermentation broths or solutions containing the same.

The following examples are presented to show specific methods of producing certain of the novel compounds included within this invention. It is understood, however, that these examples are included only for the purposes of illustration, and that the invention is not to be restricted to the embodiments specifically disclosed therein.

EXAMPLE 1

N-methyl-2-(benzhydrylaminomethyl)-pyrrolidine

A mixture containing 40.0 g. (0.30 mole) of N-methyl-3-chloropiperidine, 54.9 g. (0.30 mole) of benzhydrylamine and 300 cc. of di-isobutylcarbinal was stirred and refluxed for 15 hours. The precipitate was removed by filtration and the filtrate concentrated by distillation in vacuo. The residual oil and the precipitate were placed in 250 cc. of water, the aqueous mixture made strongly alkaline with potassium hydroxide and extracted with ether. The ether extracts were dried with potassium carbonate and the product collected by distillation; B. P. 200–235° C. (0.50 mm.).

EXAMPLE 2

*N-methyl-2-(benzhydrylaminomethyl)-pyrrolidine*

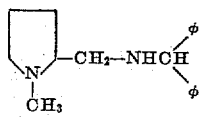

47.8 g. (0.17 mole) of base (Example 1) were converted to the hydrochloride in ether by the addition of ethereal hydrochloric acid. The precipitate was isolated by filtration and recrystallized from a mixture of 200 cc. ethanol and 300 cc. isopropyl alcohol; M. P. 246–247° C.

EXAMPLE 3

*N-methyl-2-(p-chlorobenzhydrylaminomethyl)-pyrrolidine*

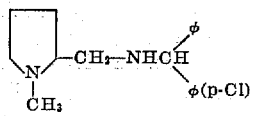

A mixture containing 400 g. (3.0 moles) N-methyl-3-chloropiperidine, 653 g. (3.0 moles) of p-chlorobenzhydrylamine and 2.0 liters of di-isobutylcarbinol was refluxed with stirring for 16 hours. The solvent was removed by distillation in vacuo, the residue suspended in 700 cc. of water, the aqueous mixture made strongly alkaline with solid potassium hydroxide and extracted with ether. The ether extracts were dried with potassium carbonate and the product collected by distillation; B. P. 170–173° C. (0.04 mm.).

EXAMPLE 4

*N-methyl-2-(p-chlorobenzhydrylaminomethyl)-pyrrolidine dihydrochloride*

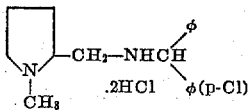

The dihydrochloride of the base (Example 3) was formed in ether by the addition of ethereal hydrochloric acid to the basic diamine. The crude product was recrystallized from a mixture of ether-ethanol, M. P. 184–185° C.

EXAMPLE 5

*N-(N'-methyl-2-pyrrolidylmethyl)-N-methyl-benzhydrylamine*

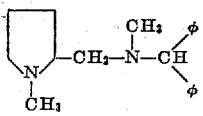

A mixture of 28.0 g. (0.10 mole) of N-methyl-2-(benzhydrylaminomethyl)-pyrrolidine (Example 1), 29.0 g. (0.56 mole) of 88% formic acid, 10.0 g. (0.12 mole) of formaldehyde was refluxed for five hours. To the reaction mixture was then added 12 cc. of concentrated hydrochloric acid and the solvents removed by distillation in vacuo. The residue was partially dissolved in hot acetone and the unreacted N-methyl-2-(benzhydrylamino-methyl)-pyrrolidine dihydrochloride removed by fi tion. The filtrate was evaporated to dryness, the res dissolved in water, the aqueous solution made stro alkaline by the addition of solid potassium hydro and the alkaline mixture extracted with ether. The e extracts were dried with potassium carbonate and product collected by distillation; B. P. 133–135° (0.04 mm.).

EXAMPLE 6

*N-(N'-methyl-2-pyrrolidylmethyl)-N-methyl-benzhydrylamine dihydrochloride*

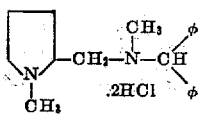

To an isopropyl alcoholic solution of the base (Exar 5) was added ethereal hydrochloric acid until the s tion was strongly acid. The crystalline product me at 225–226° C.

Various changes and modifications of the inven can be made and, to the extent that such variations corporate the spirit of this invention, they are inter to be included within the scope of the appended clair

What is claimed is:

1. A member of the group of compounds of the forn

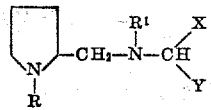

and

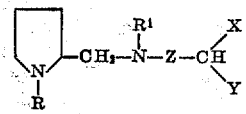

wherein R represents a lower alkyl group, $R^1$ repres a member of the group consisting of hydrogen and lo alkyl groups, Z is a lower alkylene group, and X an are members of the group consisting of phenyl, ni phenyl, lower alkyl-phenyl, lower alkoxy-phenyl halophenyl groups, and nontoxic lower alkyl quatern ammonium salts, nontoxic phenyl-lower alkyl quatern ammonium salts and nontoxic acid addition salts ther 2. N-methyl-2-(benzhydrylaminomethyl)-pyrrolidin
3. N - methyl - 2 - (p - chlorobenzhydrylaminometh) pyrrolidine.
4. N - (N' - methyl - 2 - pyrrolidylmethyl) - N - metl benzhydrylamine.
5. N - ethyl - 2 - (3,3 - diphenylpropylaminomethy pyrrolidine.
6. N - propyl - 2 - (4,4 - diphenylbutylaminomethy pyrrolidine.
7. N - methyl - 2 - (p-methylbenzhydrylaminometh) pyrrolidine.

References Cited in the file of this patent

Reitsema: J. Am. Chem. Soc., vol. 71, pp. 204 (1949).